United States Patent [19]

Halling

[11] Patent Number: 4,553,775
[45] Date of Patent: Nov. 19, 1985

[54] RESILIENT ANNULAR SEAL WITH SUPPORTING LINER

[75] Inventor: Horace P. Halling, Laurel, Md.

[73] Assignee: Pressure Science Incorporated, Beltsville, Md.

[21] Appl. No.: 488,648

[22] Filed: Apr. 26, 1983

[51] Int. Cl.[4] .......................... F16L 27/06; F16L 9/14
[52] U.S. Cl. ..................................... 285/55; 285/166; 285/175; 285/261; 285/271; 285/367
[58] Field of Search ............... 285/261, 263, 424, 114, 285/115, 166, 397, 367, 175, 271, 55

[56] References Cited

U.S. PATENT DOCUMENTS

| | | | |
|---|---|---|---|
| 2,381,426 | 8/1945 | Allen et al. | 285/186 |
| 2,774,618 | 12/1956 | Alderson | 285/223 |
| 2,781,205 | 2/1957 | Lane et al. | 285/166 X |
| 2,857,177 | 10/1958 | Loetz | 285/166 |
| 4,054,306 | 10/1977 | Sadoff, Jr. et al. | 285/233 |
| 4,071,268 | 1/1978 | Halling et al. | 285/95 |
| 4,071,269 | 1/1978 | Halling et al. | 285/165 |
| 4,165,107 | 8/1979 | Affa et al. | 285/41 |
| 4,427,220 | 1/1984 | Decker | 285/263 |

FOREIGN PATENT DOCUMENTS

| | | | |
|---|---|---|---|
| 1097731 | 1/1968 | United Kingdom | 285/261 |
| 2083154 | 3/1982 | United Kingdom | 285/397 |

Primary Examiner—Dave W. Arola
Attorney, Agent, or Firm—Roylance, Abrams, Berdo & Goodman

[57] ABSTRACT

A fluid-tight sealing apparatus with a protective liner for sealing a pair of tubes having high temperature and pressure fluid flowing therethrough. The apparatus comprises an inner tubular surface coupled to the first tube and a sealing assembly coupled to the second tube and receivable in the inner tubular surface in an interference fit. The sealing assembly comprises a metallic, annular resilient sealing member and a rigid protective liner located inside and substantially concentric to the sealing member but spaced inwardly therefrom for limiting radially inward deformation of the sealing member to prevent plastic deformation thereof.

15 Claims, 6 Drawing Figures

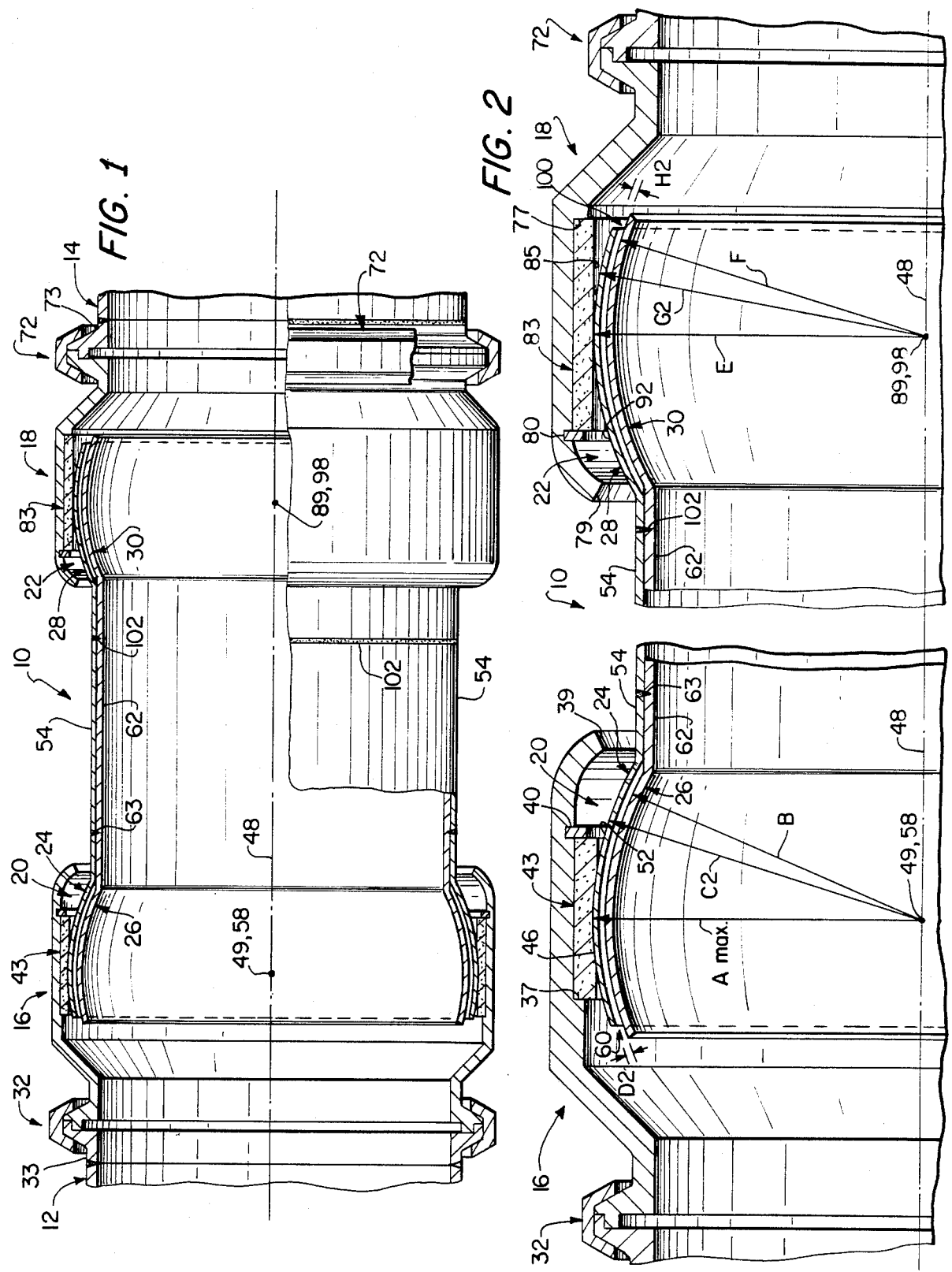

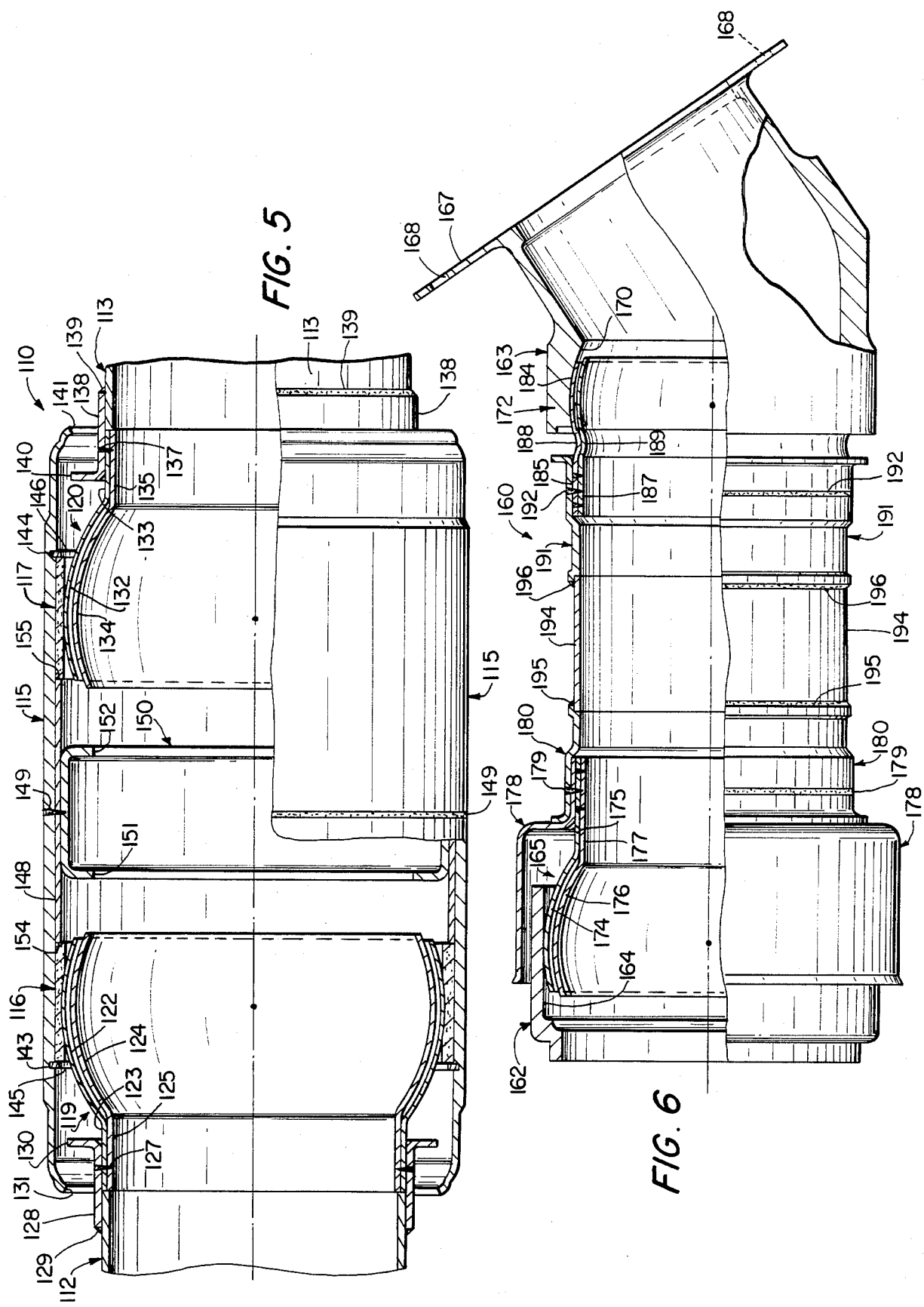

RESILIENT ANNULAR SEAL WITH SUPPORTING LINER

FIELD OF THE INVENTION

The invention relates to a fluid-tight sealing apparatus for sealing a pair of pipes having high temperature and pressure fluid flowing therethrough. The apparatus includes a sealing assembly comprising a metallic, annular resilient sealing member and a rigid supporting liner located inside and substantially concentric to the sealing member for limiting inward deformation of the sealing member to prevent plastic deformation thereof.

BACKGROUND OF THE INVENTION

Metallic, resilient annular seals that couple and seal first and second tubes have proved highly advantageous for use in the aircraft industry with tubes carrying high pressure and temperature fluid, especially in aircraft engines. Examples of these seals are disclosed in U.S. Pat. Nos. 4,054,306 to Sadoff, Jr. et al; and 4,071,268 and 4,071,269 to Halling et al.

While these resilient annular seals have proved capable of sealing at high temperatures, they are fragile because of their small thickness and are therefore prone to damage during manufacture, installation and misuse after installation. Such damage usually occurs when accidental radial forces compress or shear the annular seal past its elastic limit and causes plastic deformation of the material, which can render the seal useless.

Examples of other annular seals are disclosed in the following U.S. Pat. Nos: 2,381,426 to Allen et al; 2,774,618 to Alderson; 2,857,177 to Loetz; and 4,165,107 to Affa et al.

Thus, there exists a continuing need for improvement of metallic resilient annular seals for sealing and coupling tubes or pipes having high pressure and temperature fluid flowing therethrough.

SUMMARY

Accordingly, a primary object of the invention is to provide a metallic, resilient annular seal with a protective, supporting liner to resist damage to the fragile seal.

Another object of the invention is to provide such a seal with a supporting liner that limits the inward deformation of the seal to prevent plastic deformation or instability thereof.

Another object of the invention is to provide such a seal with a protective supporting liner that is easy to construct and does not interfere with the sealing activity of the seal.

The foregoing objects are basically attained by providing in a fluid-tight sealing apparatus for sealing a pair of tubes, the first tube having an inner tubular surface and the second tube having a metallic, resilient annular sealing member extending therefrom, the sealing member comprising a ring portion having a curved outer surface for engagement with the inner tubular surface, the curved outer surface having a free maximum radius greater than the largest radius of the inner surface to provide an interference fit between the curved outer surface and the inner tubular surface, the improvement comprising: a rigid assembly, coupled to the sealing member and located inside and substantially concentric to the ring portion but spaced inwardly therefrom, for limiting radially inward deformation of the ring portion to prevent plastic deformation thereof.

Advantageously, the rigid assembly is formed from a protective supporting liner that is annular and has an outer surface which has a curved cross section in the axial direction. In combination therewith, advantageously the ring portion has a curved inner surface which has the same radius of curvature as the supporting liner in the axial direction.

Other objects, advantages and salient features of the invention will become apparent from the following detailed description, which, taken in conjunction with the annexed drawings, discloses preferred embodiments of the invention.

DRAWINGS

Referring now to the drawings which form a part of this original disclosure:

FIG. 1 is a side elevational view in partial longitudinal section showing a pair of sealing assemblies in accordance with the invention sealing and coupling a pair of annular flanges together, these flanges in turn being coupled to a pair of pipes;

FIG. 2 is an enlarged, fragmentary elevational view in longitudinal section of the first and second sealing assemblies and annular flanges shown in FIG. 1;

Figure 3:
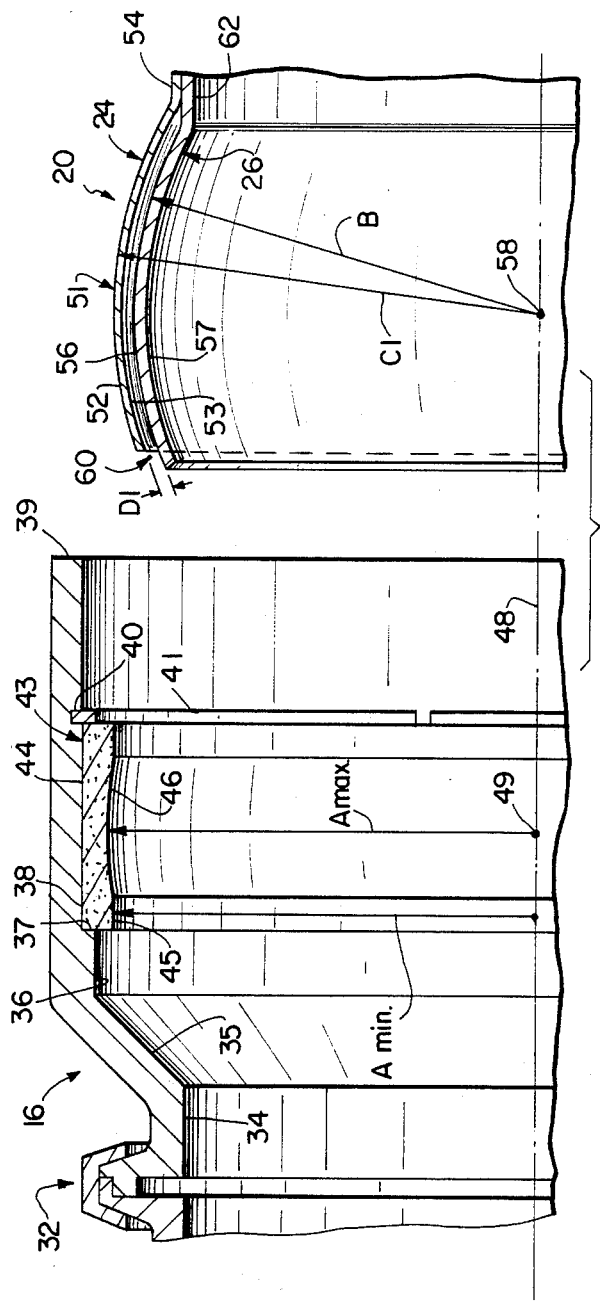
FIG. 3 is an enlarged, fragmentary elevational view in longitudinal section of the first annular flange and the first sealing assembly, the sealing assembly about to be inserted in the flange.

FIG. 5 is a side elevational view in partial longitudinal section of a modified sealing apparatus incorporating a second pair of sealing assemblies, both of which are engaged with a single outer shell; and FIG. 6 is a side elevational view in partial longitudinal section showing a second modified sealing apparatus wherein one of the annular flanges has a cylindrical inner surface and the other annular flange has an inner surface which includes a portion of a sphere.

DETAILED DESCRIPTION OF THE INVENTION

Referring now to FIGS. 1-4, the fluid-tight sealing apparatus 10 in accordance with the invention seals and connects first and second pipes 12 and 14 and comprises a first annular flange 16 coupled to the first pipe, a second annular flange 18 coupled to the second pipe, and first and second sealing assemblies 20 and 22 which are coupled together and which are respectively received in an interference fit in the first and second flanges 16 and 18. The first sealing assembly 20 comprises a metallic, resilient annular sealing member 24 and an annular rigid supporting member 26 which is located inside and substantially concentric to the sealing member but is spaced therefrom. The second sealing assembly 22 is similarly constructed by sealing member 28 and supporting member 30. In both cases, the sealing member is received via an interference fit with the inner tubular surface of the flange to couple and seal the flange and the sealing member. Because the supporting members are rigid and located inside each of the sealing members, they limit inward deformation of the sealing members to prevent plastic deformation thereof.

Referring now to FIG. 3, the first annular flange or housing 16 is formed of metal, such as stainless steel, and has at one end a connector 32 as well as a suitable profile for releasably clamping it to an adaptor 33 which is welded to the first pipe 12 in order to releasably connect the pipe to the first flange 16. This connector is conventional, is used with a seal (not shown) and is disclosed in U.S. Pat. No. 3,797,836 to Halling, the disclosure of which is hereby incorporated by reference. Extending from the end of the flange adjacent the connector 32 the flange has an inner cylindrical surface 34, a frustoconical outwardly tapering surface 35, a cylindrical surface 36, an axially facing annular shoulder 37 and a cylindrical surface 38 which extends to the distal end 39 of the flange. As seen in FIGS. 1 and 2, this distal end 39 is inwardly deformed to reduce the diameter thereof, this being done once the first sealing assembly 20 is inserted into the flange 16. Spaced inwardly from distal end 39 is a radially outwardly extending annular recess 40 in cylindrical surface 38 for the reception of a split retaining ring 41. Located between ring 41 and shoulder 37 is a carbon-graphite sleeve 43 having an outer cylindrical surface 44 rigidly embracing the inner cylindrical surface 38 on the flange and an inner cylindrical surface 45 having a radius designated A min. Formed in the inner cylindrical surface 45 of sleeve 43 is a recess 46 which is curved in cross section in the axial direction of the flange, this curved recess defining a portion of a sphere and having a radius of curvature as well as a maximum radius from the center line 48 of the flange designated A max. The center point 49 of this portion of a sphere is shown in FIGS. 1, 2 and 3 along center line 48.

The first sealing assembly 20 as seen in FIGS. 2 and 3, comprises the metallic, annular resilient sealing member 24 and the rigid annular supporting member 26. The sealing member 24 is disclosed in U.S. Pat. Nos. 4,054,306 to Sadoff, Jr. et al; and 4,071,268 and 4,071,269 to Halling et al, the disclosures of which are hereby incorporated by reference. For present purposes, this metallic resilient sealing member 24 is formed of a uniform thickness, for example, 0.012±0.001 inch and is elastically deformable. The sealing member can advantageously be formed of Inconel. This sealing member 24 comprises a ring portion 51 with an outer surface 52 and an inner surface 53, both of these surfaces having a curved cross section in the axial direction. The radius of curvature C1 of the outer surface 52 can be such that this outer surface forms a portion of a sphere having a center point at 58 along center line 48, although the radius of curvature could be smaller if desired. Radius C1 represents the free maximum radius of the ring portion in its relaxed, undeformed condition and advantageously can have the same center point as the radius of curvature of inner surface 53.

As seen in FIGS. 2 and 3 extending integrally and axially from the tapering end of the sealing member 24 is an annular portion 54 which is cylindrical. This annular portion defines a tube from which the sealing member 24 extends.

As seen in FIGS. 2 and 3, the rigid supporting member 26 is formed as an annular liner which has a uniform thickness of about 0.030±0.001 inch and can be formed of stainless steel. Advantageously, the sealing member and supporting member have the same thermal expansion coefficient so they expand or contract essentially equally. The supporting member 26 has an outer surface 56 and an inner surface 57, both of which are curved in cross section in the axial direction and both of which form a portion of a sphere, the center points thereof being located at point 58 on center line 48. The radius of curvature of the outer surface 56 is designated B in FIG. 3, this radius being smaller than the radius of inner surface 53 on the sealing member 24. Alternatively, the radius of curvature of the surface 56 can be smaller than B but advantageously surface 56 and surface 53 are concentric.

Thus, the supporting member 24 is located inside and is substantially concentric to the sealing member 24 but is spaced inwardly therefrom to define a gap 60 which has an initial radial width of about 0.005 to 0.006 inch and designated D1 in FIG. 3. This gap is in the form of a portion of a sphere.

As seen in FIGS. 2 and 3, extending from supporting member 25 is an annular support 62 which is integrally formed with the supporting member 26 and which is cylindrical. This annular support 62 and the annular portion 54 are welded together via weld 63, as seen in FIG. 2, so that the sealing member 24 and the supporting member 26 are rigidly coupled together. As seen in FIGS. 1–3, the distal end of the supporting member 26 extends axially past the distal end of the sealing member 24 so as to protect the free end of the sealing member.

By comparing FIGS. 3 and 2, it is clear that the sealing assembly 20 is inserted into flange 16 so that the outer surface 52 of the ring portion 51 engages with the inner tubular and curved surface 46 of sleeve 43 via an interference fit with the outer surface 52 being radially inwardly but elastically deformed into recess 43. This radial deformation reduces gap 60 between the sealing member 24 and the supporting member 26 from the initial width D1 to a smaller width D2 shown in FIG. 2, with the radius of the outer surface 52 reducing from the free maximum radius C1 shown in FIG. 3 to a reduced radius C2 shown in FIG. 2. Thus, the width of gap 60 is chosen to be less than the amount of deformation that would cause all or any part of the curved portion of the sealing member to plastically deform.

Thus, if inadvertent radial compressive or shear forces act on the sealing member 24 during manufacture, installation or after installation as shown in FIG. 2, any radially inward deformation of the sealing member 24 will be limited by contact with the rigid supporting member 26 to prevent plastic deformation thereof.

While the sealing member 24 is in an interference fit with recess 46 in sleeve 43, relative rotation and angulation can take place between these members.

As indicated in FIGS. 1 and 2, the center points 49 and 58 of the sleeve recess 46 and the outer surfaces of the sealing member 24 and supportng member 26 coincide upon full insertion of the sealing member into the sleeve.

Figure 4:
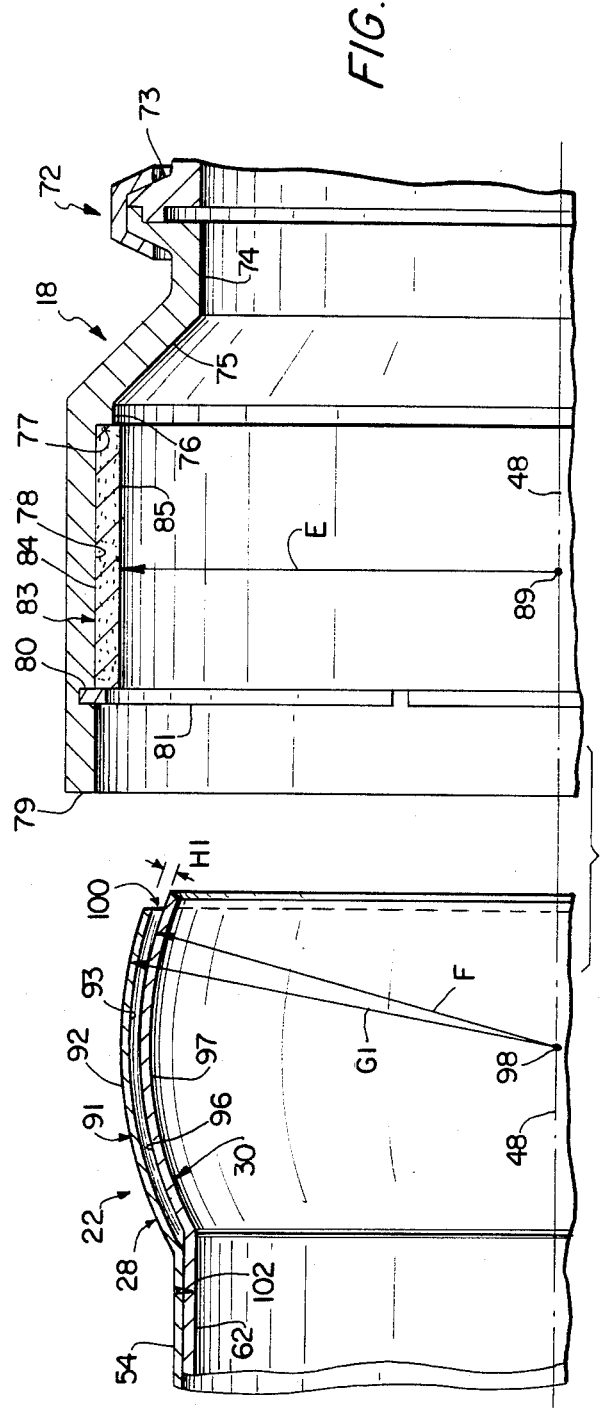
FIG. 4 is an enlarged, fragmentary elevational view in longitudinal section showing the second annular flange and the second sealing assembly, the second sealing assembly about to be inserted in the flange.

Referring now to FIG. 4, the second annular flange or housing 18 is shown together with the second sealing assembly 22, this flange and sealing assembly being similar to that shown in FIG. 3 and described above except that the inner carbon-graphite sleeve is longer and has a uniform cylindrical inner surface without a recess.

Thus, the second flange 18 has a connector 72 similar to connector 32 and, as seen in FIG. 1, releasably couples the flange 18 to the second pipe 14 via adaptor 73. The second flange has extending from connector 72 an inner cylindrical surface 74, an outwardly tapering frustoconical surface 75, a cylindrical surface 76, an annular radially extending shoulder 77, a cylindrical surface 78 having a distal end 79 that is bent in as seen in FIG. 2 once the second sealing assembly 22 is inserted into the flange. A recess 80 is formed in cylindrical surface 78 for the reception of a split retaining ring 81 which positions the carbon-graphite cylindrical sleeve 83 between it and shoulder 77. This sleeve 83 has an outer cylindrical surface 84 and an inner cylindrical surface 85, the uniform diameter thereof being designated E, this radius E extending from center point 89 on center line 48.

Referring to the second sealing assembly 22 in FIG. 4, it is comprised of the second sealing member 28 and the second supporting member 30.

The second sealing member 28 includes a curved ring portion 91 having a curved outer surface 92 and a curved inner surface 93, these surfaces having substantially the same configuration as described above regarding the first sealing member 24. The second supporting member 30 has a curved outer surface 96 and a curved inner surface 97 and is concentric to and located inside of the second sealing member 28. Inner surface 93 on the sealing member and outer surface 96 on the supporting member define a gap 100 that has a width designated H1 in the relaxed, undeformed condition shown in FIG. 4.

The radius of curvature of the outer surface 92 on the sealing member 28 is designated G1 and the radius of curvature of the outer surface 96 on the supporting member 30 is designated F, these radii having a common center point 98. As seen in FIG. 4, both the inner and outer surfaces of the sealing member and the supporting member define portions of four spheres, all of which having the same center point 98. Rather than forming portions of spheres or substantially forming portions of spheres with such a center point, the radius of curvature of the sealing member and the supporting member can be smaller.

As seen in FIGS. 2 and 4, annular portion 54 is integrally formed with the second sealing member 28 and annular support 62 is integrally formed with the second supporting member 30, annular portion 54 and annular support 62 being once again rigidly coupled via a second weld 102.

The second sealing assembly 22 can be inserted into the second flange 18 as shown by comparing FIGS. 4 and 2, with the outer surface 92 of sealing member 28 engaging the inner surface 85 of sleeve 83 in an interference fit. Upon such insertion, the sealing member 28 is radially inwardly elastically deformed as the radius G1 of the outer surface 92 is reduced to a radius G2 as seen in FIG. 2, with gap 100 being reduced from a width H1 shown in FIG. 4 to a smaller width H2 shown in FIG. 2. Once again, the width of the gap is chosen to allow any or all parts of the curved portion of the sealing member to engage the supporting member before it plastically deforms.

As seen in FIG. 2, upon insertion to a depth shown therein, center points 89 and 98 coincide, although relative axial moement of the second sealing assembly 22 and the second flange 18 can take place since the inner surface of sleeve 83 is cylindrical. Thus, these center points can move relatively in the axial direction. The sealing connection between the second sealing member and the sleeve 83 can also provide relative rotation as well as angulation.

EMBODIMENT OF FIG. 5

Referring now to FIG. 5, a modified fluid-tight sealing apparatus 110 is shown which couples and seals a pair of pipes 112 and 113. The apparatus comprises an outer annular shell 115 having a pair of carbon-graphite sleeves 116 and 117 rigidly coupled therein for the reception of first and second sealing assemblies 119 and 120, these being rigidly coupled respectively to pipes 112 and 113.

Sealing assembly 119 is similar to the sealing assemblies discussed above regarding FIGS. 1-4 and comprises a sealing member 122 having an annular portion 123 extending integrally therefrom and a supporting member 124 which is located inside and concentric to but spaced from the sealing member, and an annular support 125 extending integrally therefrom. Annular support 125 and annular portion 123 are rigidly connected together via weld 127. This weld also connects a stop ring 128 to the outside of annular portion 123, this stop ring also being welded via weld 129 to the first pipe 112. Stop ring 128 has a radially outwardly directed flange 130 which extends radially outward of the first inwardly formed distal end 131 of the outer shell to prevent inadvertent removal of the first sealing assembly 119 from the outer shell in the axial direction.

The second sealing assembly 120 is similarly constructed and includes a sealing member 132, an annular portion 133, a supporting member 134, and an annular support 135. Stop ring 138 is welded via weld 137 to the annular portion 133 and the annular support 135 and via weld 139 to the second pipe 113. The stop ring 138 has an outwardly directed flange 140 which engages the inwardly formed distal end 141 on the outer shell to prevent removal thereof.

The outer shell 115 has an inner cylindrical surface which is interrupted by two annular recesses 143 and 144 for the reception of a pair of split retaining rings 145 and 146. A centrally located cylindrical spacing sleeve 148 is welded via weld 149 to the outer shell as well as to a stop ring 150 located centrally of the sleeve and shell with radially inwardly turned ends 151 and 152 which act as stops to limit the inward movement of the first and second sealing assemblies into the outer shell.

Located between the first end 154 on sleeve 148 and retaining ring 145 is the carbon-graphite sleeve 116 and similarly located between the other end 155 of sleeve 148 and ring 146 is the other carbon-graphite sleeve 117. Sleeve 117 has an inner cylindrical surface like sleeve 83 described above while sleeve 116 has a combination of an inner cylindrical surface with a recess forming a portion of a sphere similar to sleeve 43 discussed above.

The modified fluid-tight sealing apparatus 110 shown in FIG. 5 is formed by inserting the sealing assemblies into the carbon-graphite sleeves as discussed above regarding FIGS. 1-4. However, as is evident from FIG. 5, there is a single outer sleeve 115 that is coupled to the two pipes 112 and 113, each pipe having a respective sealing assembly 119 and 120 thereon to seal and connect the pipes in fluid flow communication.

EMBODIMENT OF FIG. 6

As seen in FIG. 6, a second modified fluid-tight sealing apparatus 160 is shown for connecting and sealing a first tube 162 and an annular receptacle 163.

The first tube 162 is metallic and has an inner cylindrical surface 164 for sealing engagement with a first sealing assembly 165 and the receptacle 163 is essentially annular having a rectangular flange 167 with a plurality of apertures 168 so the flange can be bolted to a support or pipe as necessary. The receptacle 163 has an inner surface 170 in the form of a portion of a sphere which is engaged with a second sealing assembly 172.

The first sealing assembly 165 is similar to the sealing assemblies discussed above and comprises a sealing member 174, an annular portion 175, a supporting member 176 and an annular support 177. The sealing member 174 is received in engagement with cylindrical surface 164 in an interference fit. A protective cup 178 is located in a position to surround sealing member 174 and is welded to the outer surface of the annular portion 175 via weld 179, this weld also connecting an annular end adaptor 180 to the protective cup. As discussed above, the annular portion 175 and the annular support 177 are rigidly coupled together via suitable welds therebetween.

The second sealing assembly 172 is similar to the sealing assemblies discussed above and includes a sealing member 184, an annular portion 185, a supporting member 186 and an annular support 188. Located between the sealing member and the annular portion is an annular inwardly curved portion 188 and similarly located between the supporting member and the annular support is an annular curved portion 189. The sealing member 184 is an interference fit engagement with the curved inner surface 170 of receptacle 163.

A second end adaptor 191, similar to adaptor 180, is welded via weld 192 to annular portion 185 and annular support 187.

The two end adaptors 180 and 190 are coupled together in fluid flow communication via a tube 194 which is welded to each respectively via welds 195 and 196.

Thus, the fluid-tight sealing apparatus 160 can conduct fluid flow between the first tube 162 and the receptacle 163 via the first and second sealing assemblies 165 and 172 as well as tube 194 and end adaptors 180 and 191.

While various advantageous embodiments have been chosen to illustrate the invention, it will be understood by those skilled in the art that various changes and modifications can be made therein without departing from the scope of the invention as defined in the appended claims.

What is claimed is:

1. In a fluid-tight sealing apparatus for sealing a pair of tubes, the first tube having an inner tubular surface and the second tube having a metallic, resilient annular sealing member extending therefrom, the sealing member comprising a ring portion having a curved outer surface for engagement with the inner tubular surface, the curved outer surface having a free maximum radius greater than the largest radius of the inner surface to provide an interference fit between the curved outer surface and the inner tubular surface, the improvement comprising:
   rigid means, coupled to said sealing member and located inside and substantially concentric to said ring portion but spaced inwardly therefrom, for limiting radially inward deformation of said ring portion to prevent plastic deformation thereof,
   said ring portion having a curved cross section in the axial direction, which cross section is concave in the radially inwardly facing direction,
   said rigid means having an outer surface which has a curved cross section in the axial direction and is convex in the radially outwardly facing direction.

2. The improvement according to claim 1, wherein said rigid means comprises an annular liner.

3. The improvement according to claim 2, wherein said annular liner has an inner surface which has a curved cross section in the axial direction.

4. The improvement according to claim 2, wherein said annular liner forms a portion of a sphere.

5. The improvement according to claim 1, wherein said ring portion extends to the distal end of said sealing member, and
   said rigid means extends past said ring portion.

6. The improvement according to claim 1, wherein said sealing member further comprises an annular portion extending from and coupled to said ring portion, and
   said rigid means comprises an annular liner and an annular support extending from and coupled to said annular liner,
   said annular support being located inside said annular portion.

7. The improvement according to claim 6, wherein said annular portion is substantially cylindrical, and said annular support is substantially cylindrical.

8. The improvement according to claim 7, wherein said annular liner forms a portion of a sphere.

9. The improvement according to claim 1, wherein said inner surface has a curved cross section in the axial direction.

10. The improvement according to claim 1, wherein said inner surface is substantially cylindrical.

11. In a fluid-tight sealing apparatus for sealing a pair of tubes, the first tube having an inner tubular surface and the second tube having a metallic, resilient annular sealing member extending therefrom, the sealing member comprising a ring portion having a curved outer surface for engagement with the inner tubular surface, the curved outer surface having a free maximum radius greater than the largest radius of the inner surface to provide an interference fit between the curved outer surface and the inner tubular surface, the improvement comprising:
   rigid means, coupled to said sealing member and located inside and substantially concentric to said ring portion but spaced inwardly therefrom, for limiting radially inward deformation of said ring portion to prevent plastic deformation thereof,
   said ring portion forming a portion of a first sphere, and
   said rigid means comprising an annular liner forming a portion of a second sphere,
   said first and second spheres having a common center point, the radius of the first sphere being larger than the radius of the second sphere.

12. A fluid-tight sealing apparatus for coupling first and second pipes, the combination comprising:
   an outer shell;
   a first tubular member, having a first inner tubular surface, rigidly coupled inside said outer shell;
   a second tubular member, having a second inner tubular surface, rigidly coupled inside said outer shell;
   a first sealing assembly coupled to the first pipe;
   said first sealing assembly comprising
     a first metallic, resilient annular sealing member having a first ring portion with a first curved outer surface for engaging said first inner tubular surface,
     said first curved outer surface having a free maximum radius greater than the largest radius of said first inner surface to provide an interference fit between said first curved outer surface and said first inner surface, and
     first rigid means, coupled to said first sealing member and located inside and substantially concentric to said first ring portion but spaced inwardly therefrom, for limiting radially inward deformation of said first ring portion to prevent plastic deformation thereof, said first ring portion having a curved cross section in the axial direction, which cross section is concave in the radially inwardly facing direction, said first rigid means having an outer surface which has a curved cross section in the axial direction and is convex in the radially outwardly facing direction, and a second sealing assembly coupled to the second pipe, said second sealing assembly comprising a second metallic, resilient annular sealing member having a second ring portion with a second curved outer surface for engaging said second inner tubular surface, said second curved outer surface having a free maximum radius greater than the largest radius of said second inner surface to provide an interference fit between said second curved outer surface and said second inner surface, and second rigid means, coupled to said second sealing member and located inside and substantially concentric to said second ring portion but spaced inwardly therefrom, for limiting radially inward deformation of said second ring portion to prevent plastic deformation thereof, said second ring portion having a curved cross section in the axial direction, which cross section is concave in the radially inwardly facing direction, said second rigid means having an outer surface which has a curved cross section in the axial direction and is convex in the radially outwardly facing direction.

13. An apparatus according to claim 12, wherein each of said first and second rigid means comprises an annular liner.

14. A fluid-tight sealing apparatus for coupling first and second pipes, the combination comprising:

a first annular flange coupled to the first pipe and having a first inner tubular surface rigidly located therein;

a second annular flange coupled to the second pipe and having a second inner tubular surface rigidly located therein;

a first sealing assembly comprising a first metallic, resilient annular sealing member having a first ring portion with a first curved outer surface for engaging said first inner tubular surface, said first curved outer surface having a free maximum radius greater than the largest radius of said first inner surface to provide an interference fit between said first curved outer surface and said first inner surface, and first rigid means, coupled to said first sealing member and located inside and substantially concentric to said first ring portion but spaced inwardly therefrom, for limiting radially inward deformation of said first ring portion to prevent plastic deformation thereof, said first ring portion having a curved cross section in the axial direction, which cross section is concave in the radially inwardly facing direction, said first rigid means having an outer surface which has a curved cross section in the axial direction and is convex in the radially outwardly facing direction;

a second sealing assembly comprising a second metallic, resilient annular sealing member having a second ring portion with a second curved outer surface for engaging said second inner tubular surface, said second curved outer surface having a free maximum radius greater than the largest radius of said second inner surface to provide an interference fit between said second curved outer surface and said second inner surface, and second rigid means, coupled to said second sealing member and located inside and substantially concentric to said second ring portion but spaced inwardly therefrom, for limiting radially inward deformation of said second ring portion to prevent plastic deformation thereof, said second ring portion having a curved cross section in the axial direction, which cross section is concave in the radially inwardly facing direction, said second rigid means having an outer surface which has a curved cross section in the axial direction and is convex in the radially outwardly facing direction, and means for coupling said first and second sealing assemblies together for fluid flow therebetween.

15. An apparatus according to claim 14, wherein each of said first and second rigid means comprises an annular liner.

* * * * *